Patented Mar. 14, 1944

2,344,105

UNITED STATES PATENT OFFICE 2,344,105

EXTERMINATING AGENT FOR VERMIN

Gerhard Peters, Frankfort-on-the-Main, Germany; vested in the Alien Property Custodian No Drawing. Application May 26, 1939, Serial No. 276,021. In Germany June 7, 1938

2 Claims. (Cl. 167—22)

My invention relates to the extermination of animal pest-life of the most varied kinds, for instance, warm-blooded obnoxious animals and insects.

According to my invention halogenated nitriles, such as for instance, trichloracetonitrile or trichlorpropionitrile, are extraordinarily well suited for this purpose.

Detailed experiments have shown that the above-mentioned substances, especially the chlorinated nitriles give surprisingly good effects. At the same time the danger of a harmful influence on human beings is considerably lessened by the fact that the presence of even small quantities of these substances causes a strong irritation of the eyes but without doing any real harm. On the other hand these irritating effects have the advantage of driving out the vermin from their holes or hiding places respectively and this even with the slightest traces of the above mentioned substances. In consequence thereof the vermin is exposed in the open to the full influence (effect) of the exterminating agent and killed very easily. With warm-blooded animals, for instance, rats, the irritating effect has the further advantage that these animals do not perish in their hiding places, but come out first and consequently may be carried away easily after extermination.

The distribution of the exterminating substances or their vapors in the rooms to be treated may be carried into effect in a known manner, for instance, by exposing the substances in vessels or by spraying them with the aid of suitable devices, or in any other suitable way.

The substances according to my invention may be used either alone or in mixture with other substances which may be likewise exterminating agents or inert. Liquid substances or their mixtures with other substances with insecticidal effect or not, may be utilized advantageously after a well known manner by absorption in suitable carriers, as for instance, wood-pulp or kieselguhr.

As the above mentioned substances do not tend to chemical conversion neither with the materials to be treated nor with the other substances for instance, metals, which may come into contact with the exterminating means or their vapors, no damage will occur in this respect.

In carrying out my invention it has been found especially advantageous to use halogenated nitriles in combination with other low boiling insecticides, as for instance, cyanogen chloride, ethylene oxide, methyl bromide, methyl iodide or the like. The substances according to my invention are especially suited for this purpose as they mix with low boiling insecticides to a very considerable extent.

Exhaustive experiments have shown that mixtures of halogenated nitriles, such as tri-chloracetonitrile, with methyl bromide provide particularly valuable insecticidal properties. Thereby it has been found that effects may be attained which surpass considerably the expected effects based on the efficiency of the single components. Experiments with *Tribolium confusum* have shown that for a certain effect only two-thirds of the quantity of mixture were necessary which theoretically were calculated from the single effect of the components.

Excellent effects may be obtained, for instance, with a mixture of 40 parts by weight of methyl bromide with 60 parts by weight of tri-chloracetonitrile, whereby 100 parts by weight of this liquid mixture, for instance, may be absorbed in 100 to 120 parts by weight of kieselguhr or 40 to 50 parts by weight of wood-pulp.

What I claim is:

1. Exterminating agent for animals and insects comprising a chloracetonitrile in admixture with methyl bromide.

2. Exterminating agent for animals and insects comprising trichloracetonitrile in admixture with methyl bromide.

GERHARD PETERS.